(12) United States Patent
Zeng (10) Patent No.: US 12,446,376 B2
(45) Date of Patent: Oct. 14, 2025

(54) DISPLAY PANEL AND DISPLAY DEVICE (71) Applicant: Shanghai Tianma Micro-Electronics Co., Ltd., Shanghai (CN)

(72) Inventor: Yang Zeng, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 885 days.

(21) Appl. No.: 17/450,955

(22) Filed: Oct. 14, 2021

(65) Prior Publication Data

US 2023/0011597 A1 Jan. 12, 2023

(30) Foreign Application Priority Data

Jul. 7, 2021 (CN) .......................... 202110770619.0

(51) Int. Cl.
*H10H 20/857* (2025.01)
*G06V 40/13* (2022.01)
*H10H 20/831* (2025.01)
*H10H 29/14* (2025.01)

(52) U.S. Cl.
CPC ........... *H10H 20/857* (2025.01); *G06V 40/13* (2022.01); *H10H 20/831* (2025.01); *H10H 29/142* (2025.01)

(58) Field of Classification Search
CPC .. H10H 20/857; H10H 20/831; H10H 29/142; G06V 40/13; G06V 40/1318; H01L 25/0753; H01L 25/167; H10K 59/126; H10K 59/131; H10K 59/65
See application file for complete search history.

(56) References Cited

U.S. PATENT DOCUMENTS

| | | | |
|---|---|---|---|
| 6,133,582 A * | 10/2000 | Osann, Jr. ............... | H01L 22/20 324/759.03 |
| 2003/0057419 A1* | 3/2003 | Murakami ........ | H01L 31/02164 257/E27.111 |
| 2015/0028341 A1* | 1/2015 | Sun ..................... | H01L 27/1288 438/151 |
| 2017/0271429 A1* | 9/2017 | Kim ....................... | H10K 59/35 |
| 2020/0020753 A1* | 1/2020 | Zhang .................. | H10K 59/124 |

FOREIGN PATENT DOCUMENTS

| | | |
|---|---|---|
| CN | 109887963 A | 6/2019 |
| CN | 110632781 A | 12/2019 |
| CN | 111584752 A | 8/2020 |

* cited by examiner

*Primary Examiner* — Su C Kim
(74) *Attorney, Agent, or Firm* — Anova Law Group, PLLC (57) ABSTRACT

A display panel and a display device are provided. The display panel includes a first substrate, a first metal layer including a first electrode, a first insulating layer containing a first opening, and a second metal layer. The first opening exposes at least a portion of the first electrode. The second metal layer includes a light-shielding portion and a first electrical connection portion. The light-shielding portion contains a second opening, the first electrical connection portion is electrically connected to the first electrode through the first opening. A region defined by the second opening is a first region, and a second region surrounds the first region. A portion of the first insulating layer located in the first region has a first thickness, and another portion of the first insulating layer located in the second region has a second thickness. The first thickness is smaller than the second thickness.

19 Claims, 9 Drawing Sheets

DISPLAY PANEL AND DISPLAY DEVICE

CROSS-REFERENCE TO RELATED APPLICATION

This application claims the priority of Chinese patent application No. 202110770619.0, filed on Jul. 7, 2021, the entirety of which is incorporated herein by reference.

FIELD

The present disclosure generally relates to the field of display technology and, more particularly, relates to a display panel and a display device.

BACKGROUND

With the development of display technology, display devices have been widely applied, and have gradually become indispensable electronic products used in people's daily work and life. Accordingly, more and more user privacy information has been stored in the display device.

To improve the security of the display device, more and more display devices have been integrated with a fingerprint recognition function. However, the fingerprint recognition effect of the existing display device integrated with the fingerprint recognition function needs to be improved.

SUMMARY

One aspect of the present disclosure provides a display panel. The display panel includes a first substrate, a first metal layer disposed over the first substrate and including a first electrode, and a first insulating layer disposed on a side of the first metal layer away from the first substrate. The first insulating layer contains a first opening, and the first opening exposes at least a portion of the first electrode. The display panel also includes a second metal layer disposed on a side of the first insulating layer away from the first substrate. The second metal layer includes a light-shielding portion and a first electrical connection portion that are insulated from each other. The light-shielding portion contains a second opening, the first electrical connection portion is disposed in the second opening, and the first electrical connection portion is electrically connected to the first electrode through the first opening. A region defined by the second opening is a first region, and a second region surrounds the first region. A portion of the first insulating layer located in the first region has a first thickness, and another portion of the first insulating layer located in the second region has a second thickness. The first thickness is smaller than the second thickness.

Another aspect of the present disclosure provides a display device. The display device includes a display panel and a light collection device. The display panel includes a first substrate, a first metal layer disposed over the first substrate and including a first electrode, and a first insulating layer disposed on a side of the first metal layer away from the first substrate. The first insulating layer contains a first opening, and the first opening exposes at least a portion of the first electrode. The display panel also includes a second metal layer disposed on a side of the first insulating layer away from the first substrate. The second metal layer includes a light-shielding portion and a first electrical connection portion that are insulated from each other. The light-shielding portion contains a second opening, the first electrical connection portion is disposed in the second opening, and the first electrical connection portion is electrically connected to the first electrode through the first opening. A region defined by the second opening is a first region, and a second region surrounds the first region. A portion of the first insulating layer located in the first region has a first thickness, and another portion of the first insulating layer located in the second region has a second thickness. The first thickness is smaller than the second thickness. The light collection device is disposed on a non-display side of the display panel. The light collection device collects light incident from a display side of the display panel and emitted from the non-display side of the display panel.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

An existing display device often includes a display panel and a fingerprint recognition module disposed on a non-display side of the display panel. The fingerprint recognition module performs fingerprint recognition based on the transmitted light of a region of the display panel corresponding to the fingerprint recognition module.

Figure 1:
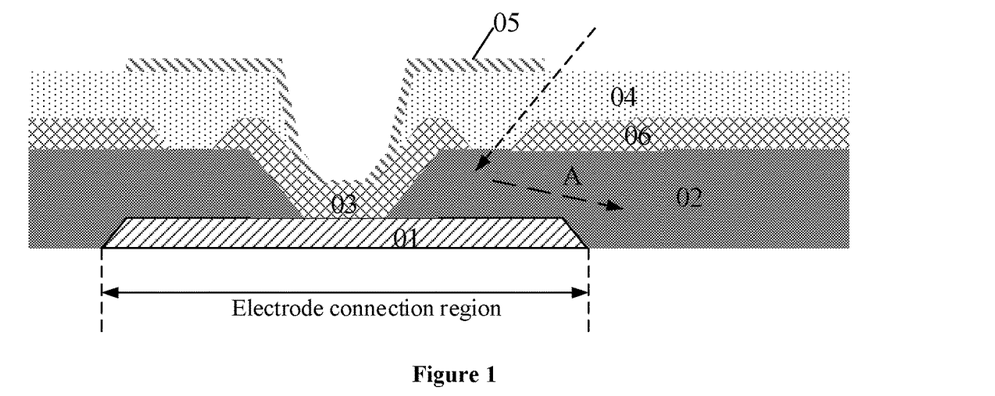
FIG. 1 illustrates a schematic diagram of a display panel.

Referring to FIG. 1, the display panel includes an electrode connection region. In the electrode connection region, the display panel includes a plurality of drain electrodes 01, a planarization layer 02, a connection electrode 03 electrically connected to a drain electrode 01 through a through-hole in the planarization layer 02, a planarization layer 04, and an anode 05 electrically connected to the connection electrode 03 through a through-hole in the planarization layer 04. The display panel also includes a light-shielding metal layer 06 disposed in a same layer as the connection electrode 03, and the light-shielding metal layer 06 and the connection electrode 03 are spaced apart by an insulating gap. It should be noted that anodes in a plurality of pixel regions of the display panel are also spaced by an insulating gap, to ensure independent display of each pixel region.

Referring to FIG. 1, the light incident from a side of the anode 05 away from the drain electrode 01, e.g., the light emitted by a light-emitting element, the light emitted by the light-emitting element and reflected by the finger to re-enter the display panel, or the ambient light, etc., sequentially passes through the insulating gap between adjacent anodes 05 and the insulating gap between the light-shielding metal layer 06 and the connection electrode 03, enters a region between the film layer of the light-shielding metal layer 06 and the film layer of the drain electrode 01, is reflected between the connection electrode 03, the light-shielding metal layer 06 and the drain electrode 01, and ultimately emits from the non-display side of the display panel. For example, the light A in the Figure is received by the fingerprint recognition module. Such optical path is at a risk of light leakage, which reduces fingerprint recognition accuracy.

Figure 2:
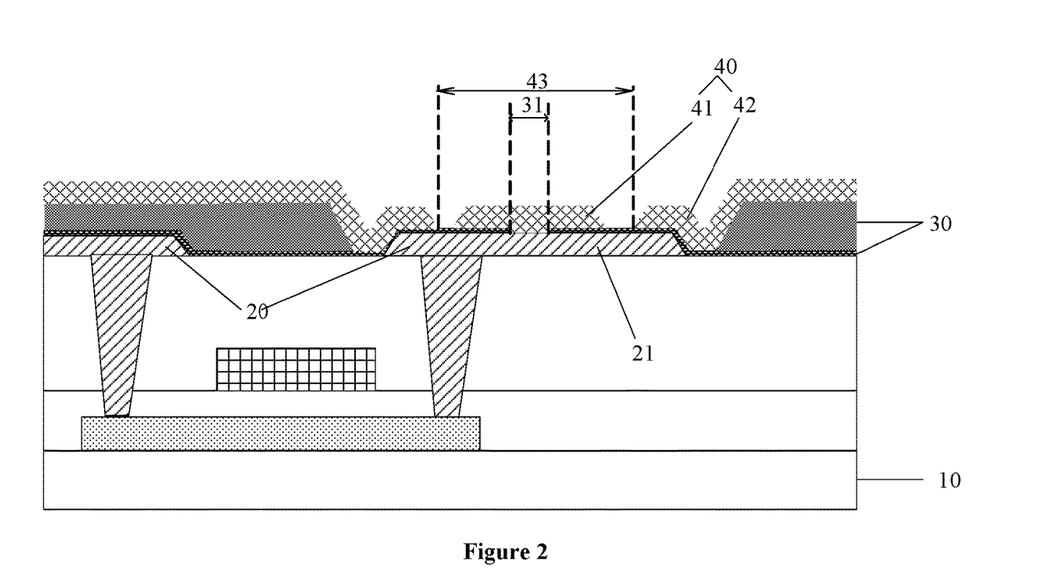
FIG. 2 illustrates a schematic diagram of an exemplary display panel consistent with disclosed embodiments of the present disclosure.

The present disclosure provides a display panel. Referring to FIG. 2, the display panel may include a first substrate 10, a first metal layer 20 disposed over the first substrate 10, a first insulating layer 30 disposed on a side of the first metal layer 20 away from the first substrate 10, and a second metal layer 40 disposed on a side of the first insulating layer 30 away from the first substrate 10.

The first metal layer 20 may include a first electrode 21. The first insulating layer 30 may contain a first opening 31, and the first opening 31 may expose at least a portion of the first electrode 21. In other words, the first metal layer 20 may have a side close to the first substrate 10 and another side away from the first substrate 10, and the first insulating layer 30 may be disposed on the side of the first metal layer 20 away from the first substrate 10. The first insulating layer 30 may contain a first opening 31, and the first opening 31 may expose at least a portion of the first electrode 21.

The second metal layer 40 may include a light-shielding portion 42 and a first electrical connection portion 41 that are insulated from each other. The light-shielding portion 42 may contain a second opening 43, and the first electrical connection portion 41 may be disposed in the second opening 43. The first electrical connection portion 41 may be electrically connected to the first electrode 21 through the first opening 31.

Figure 3:
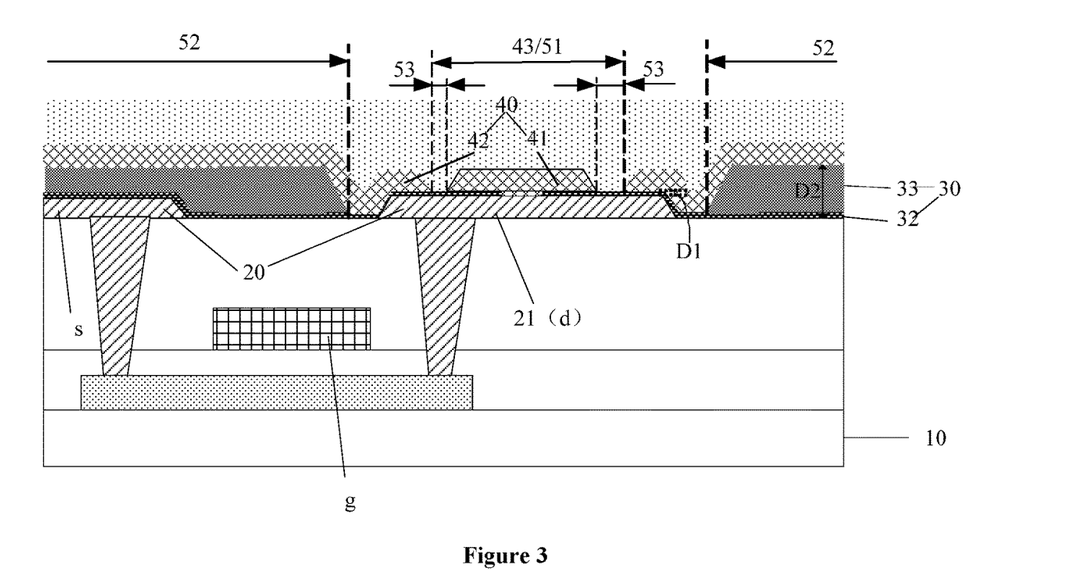
FIG. 3 illustrates a schematic diagram of another exemplary display panel consistent with disclosed embodiments of the present disclosure.

Optionally, in one embodiment, the display panel may further include a thin film transistor. Referring to FIG. 3, the thin film transistor may include a gate g, a source s, a drain d, and an active layer connecting the source s and the drain d. In one embodiment, the first electrode 21 may be the drain d of the thin film transistor.

It should be noted that in the present disclosure, the second metal layer may be disposed on the side of the first insulating layer away from the first substrate, such that the first insulating layer may be disposed between the second metal layer and the first metal layer. The first insulating layer may contain the first opening. The second metal layer may include the light-shielding portion and the first electrical connection portion. An annular slit may be formed by etching the second metal layer, and the annular slit may provide a gap between the first electrical connection portion and the light-shielding portion. The light-shielding portion may contain the second opening, and the first electrical connection portion may be disposed in the second opening, and may be electrically connected to the first electrode through the first opening. In a plane of the light-shielding portion, the light-shielding portion may be insulated from the first electrical connection portion. In a plane perpendicular to the light-shielding portion, the first insulating layer may be disposed between the light-shielding portion and the first metal layer. Therefore, in the present disclosure, the light-shielding portion and the first electrode of the first metal layer may be insulated from each other.

Referring to FIG. 2, in one embodiment, the second metal layer 40 may include the light-shielding portion 42 and the first electrical connection portion 41, and the light-shielding portion 42 may be insulated from the first electrical connection portion 41. For illustrative purposes, the gap between the light-shielding portion 42 and the first electrical connection portion 41 may be defined as a first slit. In other words, the region that is not covered by the first electrical connection portion 41 in the second opening 43 may be a first slit region.

Figure 4:
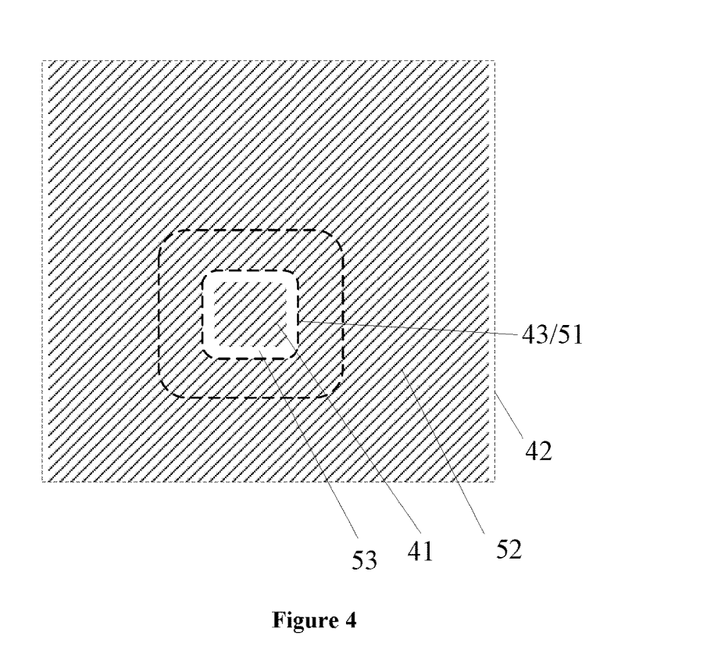
FIG. 4 illustrates a local top view of a second metal layer in an exemplary display panel consistent with disclosed embodiments of the present disclosure.

In one embodiment, referring to FIG. 3 and FIG. 4, a region defined by the second opening 43 may be a first region 51, and a second region 52 may surround the first region 51. A portion of the first insulating layer 30 disposed in the first region 51 may have a first thickness D1, and another portion of the first insulating layer 30 disposed in the second region 52 may have a second thickness D2. The first thickness D1 may be smaller than the second thickness D1, such that the portion of the first insulating layer 30 disposed over the first slit region 53 may be substantially small. In other words, in the first region 51, the spacing between the second metal layer 40 and the first metal layer 20 may be substantially small. Therefore, the amount of light that is capable of being transmitted through the first insulating layer 30 disposed in the first slit region 53 may be substantially small or zero, which may reduce the risk of light leakage of such path, may reduce the amount of light incident to the non-display side of the display panel through such path, and may improve the fingerprint recognition accuracy of the display device.

It should be noted that in one embodiment, the first region and the second region may be in direct contact and adjacent to each other, or may be adjacent to each other through any other region (i.e., the first region and the second region may be spaced apart by a gap region).

In one embodiment, the first thickness may be in a range of approximately 50 nm-500 nm, including, for example about 500 nm. Thus, on the basis of ensuring that the light-shielding portion and the first electrode are insulated from each other, the thickness of the first insulating layer disposed in the first slit region may be reduced as much as possible. Therefore, the amount of light transmitted through the first insulating layer may be reduced, and then when the display panel is applied to a display device with a fingerprint recognition function, the fingerprint recognition accuracy of the fingerprint recognition module may be improved.

In one embodiment, referring to FIG. 3, the first insulating layer 30 may include a first film layer 32 and a second film layer 33 that are stacked. The first film layer 32 may be disposed on a side of the second film layer 33 close to the first substrate 10. The first film layer 32 may be extended from the second region 52 to the first region 51, and the second film layer 33 may be disposed in the second region 52. In one embodiment, the first thickness D1 may be a thickness of the first film layer 32, and the second thickness D2 may be a sum of the thickness of the first film layer 32 and a thickness of the second film layer 33. In other words, a single insulating film layer may be disposed in the first region 51, and two insulating film layers may be disposed in the second region 52. Therefore, the thickness of a portion of the first insulating layer 30 disposed in the first region 51 may be smaller than the thickness of a portion of the first insulating layer 30 disposed in the second region 52.

Figure 5:
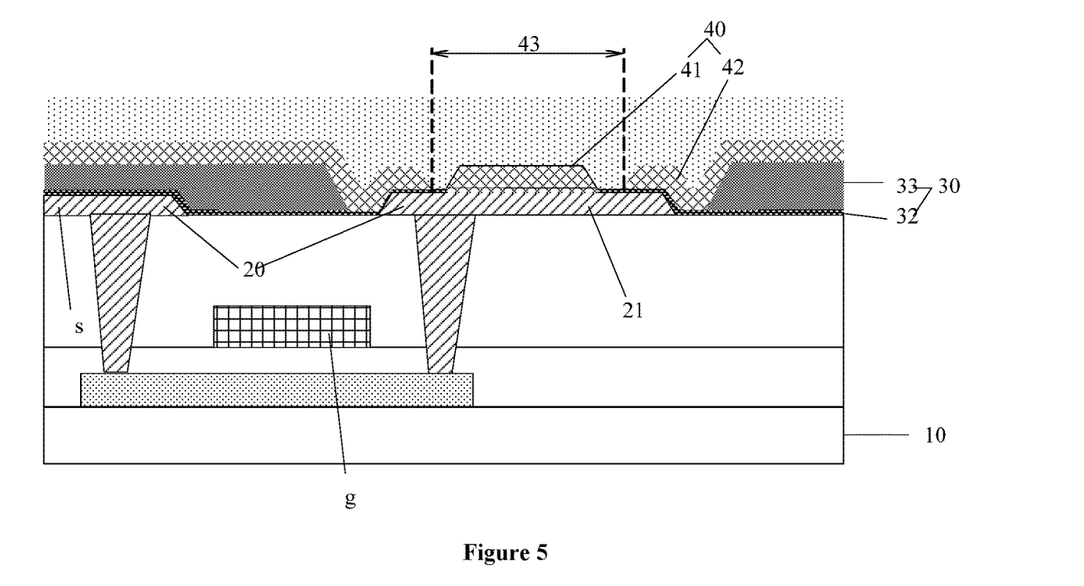
FIG. 5 illustrates a schematic diagram of another exemplary display panel consistent with disclosed embodiments of the present disclosure.

It should be noted that in one embodiment, along a direction perpendicular to the first substrate, the first film layer and the first electrical connection portion may have an overlapped region, as shown in FIG. 3. In other words, the first film layer 32 may be extended between the first electrical connection portion 41 and the first electrode 21. In another embodiment, the first film layer and the first electrical connection portion may not have an overlapped region, as shown in FIG. 5. In other words, the first film layer 32 may not be extended between the first electrical connection portion 41 and the first electrode 21.

Optionally, in one embodiment, referring to FIG. 3, a thickness of the portion of the first film layer 32 disposed in the second region 52 may be the same as a thickness of the portion of the first film layer 32 disposed in the first region 51, such that the first film layer 32 may be a film layer with uniform thickness, thereby reducing the process difficulty of forming the first film layer 32. The thickness of the portion of the first film layer 32 disposed in the second region 52 may be smaller than the thickness of the second film layer 33, such that by increasing the thickness of the second film layer 33, the insulation effect of the portion of the first insulating layer 30 disposed in the second region 52 may be improved.

Figure 6:
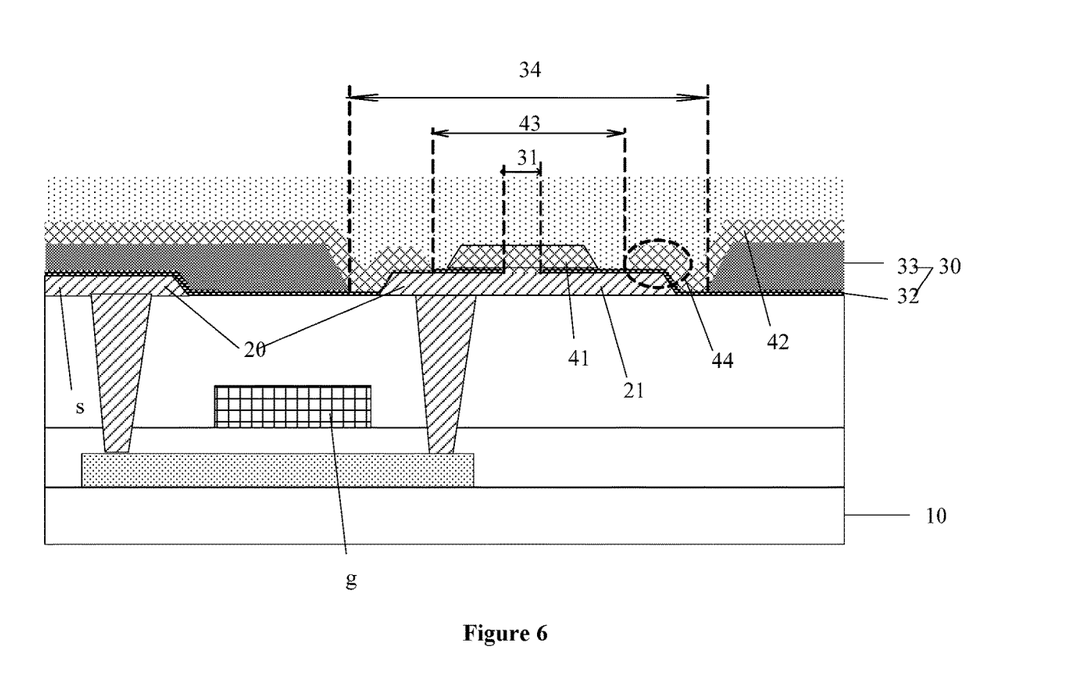
FIG. 6 illustrates a schematic diagram of another exemplary display panel consistent with disclosed embodiments of the present disclosure.

In one embodiment, referring to FIG. 6, the first film layer may contain the first opening 31, and the second film layer may contain a third opening 34. A projection of the first opening 31 on the first substrate 10 may be located within a projection of the third opening 34 on the first substrate 10. In other words, the region where the third opening 34 is located may include the region where the first opening 31 is located. A projection of the second opening 43 on the first substrate 10 may be located within the projection of the third opening 34 on the first substrate 10. In other words, the region where the third opening 34 is located may include the region where the second opening 43 is located.

It should be noted that in one embodiment, the projection of the first opening on the first substrate may be located in the projection of the third opening on the first substrate, which may refer to that an area of the projection of the first opening on the first substrate may be smaller than an area of the projection of the third opening on the first substrate. Similarly, the projection of the second opening on the first substrate may be located within the projection of the third opening on the first substrate, which may refer to that an area of the projection of the second opening on the first substrate may be smaller than an area of the projection of the third opening on the first substrate. In certain embodiments, the projection of the second opening on the first substrate may be located within the projection of the third opening on the first substrate, which may refer to that the area of the projection of the second opening on the first substrate may be equal to the area of the projection of the third opening on the first substrate, which may not be limited by the present disclosure and may be determined according to practical applications.

Optionally, in one embodiment, referring to FIG. 6, the second film layer 33 may contain the third opening 34, and the third opening 34 may be greater than the second opening 43. In other words, the area of the projection of the second opening 43 on the first substrate 10 may be smaller than the area of the projection of the third opening 34 on the first substrate 10. In one embodiment, a region of the third opening 34 excluding the second opening 43 may be a third region. In other words, in one embodiment, the first region may be connected to the second region through the third region.

In addition, in one embodiment, a portion of the light-shielding portion of the second metal layer may be disposed in the second region, and another portion of the light-shielding portion of the second metal layer may be disposed in the third region. The portion of the light-shielding portion 42 disposed in the third region and the first electrode may have an overlapped portion 44, and the overlapped portion 44 may be in contact with the first electrode 21 through the first film layer 32. It should be noted that in one embodiment, in a plane parallel to the first substrate, the area of the overlapped portion may be equal to or smaller than the area of the third region, which may not be limited by the present disclosure and may be determined according to practical applications.

In one embodiment, along a direction pointing from the first electrical connection portion to the light-shielding portion, a width of the overlapped portion may be in a range of approximately 2 μm-5 μm. When the width of the overlapped portion is too small, the light leakage blocking effect of the portion of the first insulating layer disposed under the overlapped portion and the accuracy of aligning the second metal layer and the first metal layer may be affected. When the width of the overlapped portion is too large, the overlapped portion may occupy a substantially large space and a parasitic capacitance between the light-shielding portion and the first electrode may be substantially large.

It should be noted that in one embodiment, in the first region, the first electrode may be in direct contact with the first film layer, and the first electrical connection portion may be at least partially in direct contact with the first electrode, to reduce the contact resistance between the first electrical connection portion and the first electrode.

In one embodiment, referring to FIG. 6, in a direction perpendicular to the first substrate 10, the second film layer 33 may not overlap the first electrode 21, such that the portion of the first insulating layer disposed over the first electrode 21 may have a substantially small thickness, thereby further reducing the amount of light transmitted through the first insulating layer and reducing the risk of light leakage. In certain embodiments, referring to FIG. 7, in the direction perpendicular to the first substrate 10, the second film layer 33 and the first electrode 21 may also have an overlapped portion.

Figure 8:
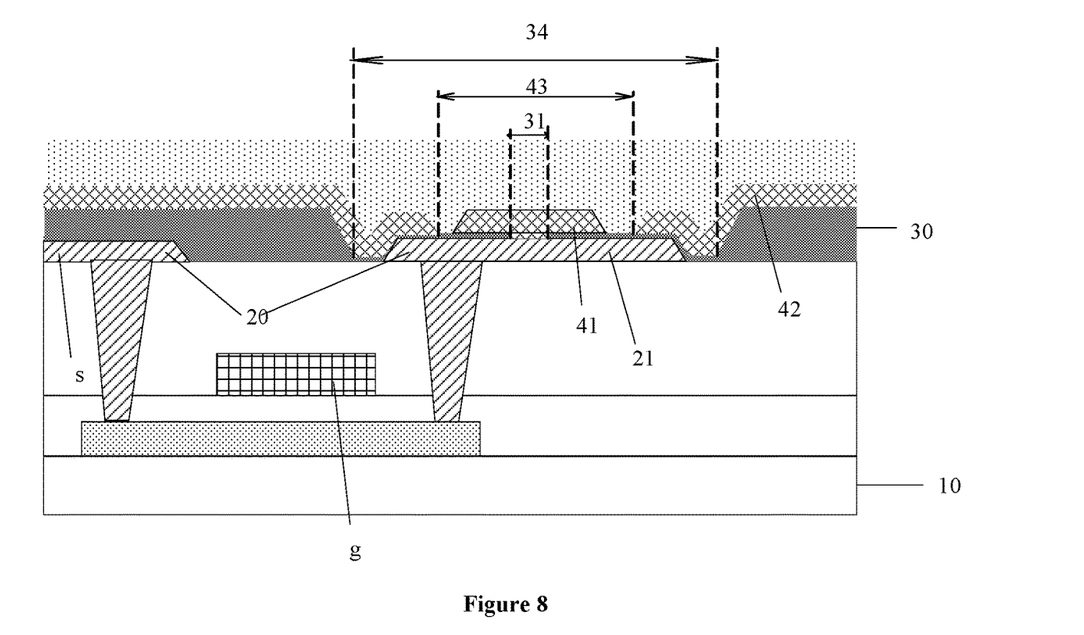
FIG. 8 illustrates a schematic diagram of another exemplary display panel consistent with disclosed embodiments of the present disclosure.

In another embodiment, the portion of the first insulating layer disposed in the first region may have a same film structure as the portion of the first insulating layer disposed in the second region, and merely the thickness of the portion of the first insulating layer disposed in the first region may be different from the thickness of the portion of the first insulating layer disposed in the second region. Referring to FIG. 8, in one embodiment, when the portion of the first insulating layer 30 disposed in the first region includes merely one film layer, the portion of the first insulating layer 30 disposed in the second region may also include merely one film layer, which may not be limited by the present disclosure. In certain embodiments, the first insulating layer may also include two or more film layers, which may be determined according to practical applications. Specifically, when the portion of the first insulating layer disposed in the first region includes two film layers, the portion of the first insulating layer disposed in the second region may also include two film layers.

Figure 9:
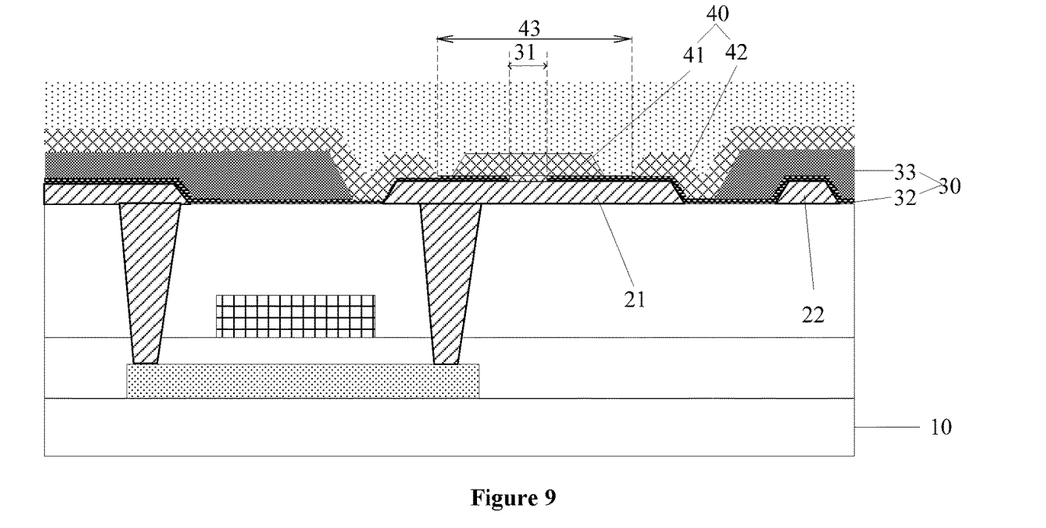
FIG. 9 illustrates a schematic diagram of another exemplary display panel consistent with disclosed embodiments of the present disclosure.

In one embodiment, referring to FIG. 9, the first metal layer may further include a plurality of wirings 22, and a wiring 22 and the first electrode 21 may be insulated from each other. Optionally, in one embodiment, the first insulating layer 30 may cover the wiring 22, such that the first insulating layer 30 may insulate and protect the wiring 22. In one embodiment, the plurality of wirings may include at least one type of data lines and power lines.

Optionally, in one embodiment, the plurality of wirings may include data lines. In one embodiment, the second film layer in the first insulating layer may cover the wiring to increase the thickness of the insulating layer between the wiring and the light-shielding portion, to reduce the parasitic capacitance between the light-shielding portion and the data line, and to improve the driving capability of the data line.

Figure 10:
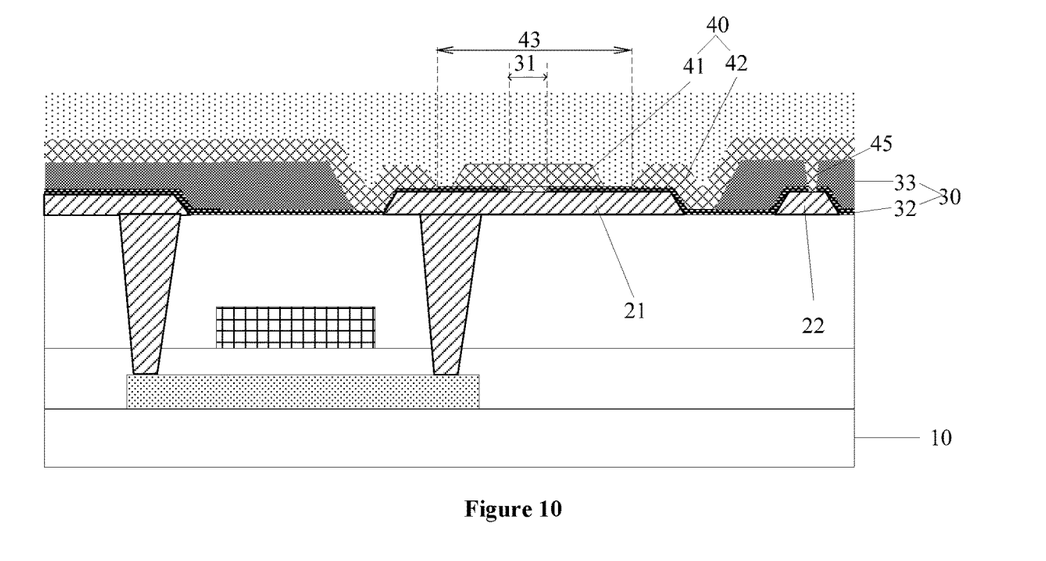
FIG. 10 illustrates a schematic diagram of another exemplary display panel consistent with disclosed embodiments of the present disclosure.

In another embodiment, the plurality of wirings may include power lines. In one embodiment, referring to FIG. 10, the power line may be electrically connected to the light-shielding portion 42 of the second metal layer through a through-hole 45, to reduce the attenuation of the power signal in the power line during transmission.

In one embodiment, the first film layer may be a passivation layer. Optionally, the passivation layer may be an inorganic layer, and may be made of one or more of silicon oxide and silicon nitride. In one embodiment, the passivation layer may have a stacked structure composed of silicon oxide and silicon nitride. A thickness of the passivation layer may be in a range of approximately 50 nm-500 nm, including, for example about 500 nm. The second film layer may be a first planarization layer. Optionally, the first planarization layer may be an organic layer, and may have a thickness in a range of approximately 1 μm-2 μm.

Optionally, in one embodiment, the thickness of the first film layer may be approximately 100 nm. On the basis of ensuring that the overlapped portion between the light-shielding portion and the first electrode is insulated from the first electrode, the thickness of the first film layer may be reduced to the greatest extent. Therefore, the amount of light transmitted to the light-transmitting region through the first film layer may be reduced, and the risk of light leakage of the first film layer may be reduced, and the fingerprint recognition accuracy of the fingerprint recognition module may be improved. The thickness of the first film layer may not be limited by the present disclosure, and may be determined according to practical applications.

In one embodiment, the first insulating layer may merely include one film layer. Referring to FIG. 8, in one embodiment, the first insulating layer may be a second planarization layer, and may be made of an organic material. It should be noted that in one embodiment, the first insulating layer may be formed by a one-step process. In specific production, a mask containing regions with different exposure amounts may be used to form the first insulating layer with the first thickness in the first region and the second thickness in the second region in one photolithography process, which may simplify the process flow of the first insulating layer. The structure of the first insulating layer may not be limited by the present disclosure, and may be determined according to practical applications.

Figure 7:
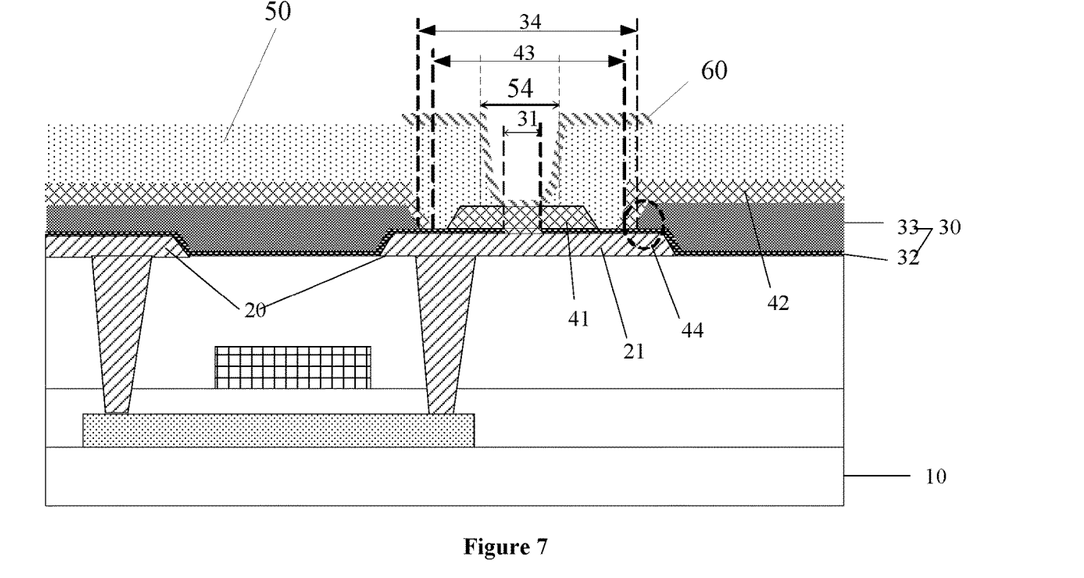
FIG. 7 illustrates a schematic diagram of another exemplary display panel consistent with disclosed embodiments of the present disclosure.
Figure 11:
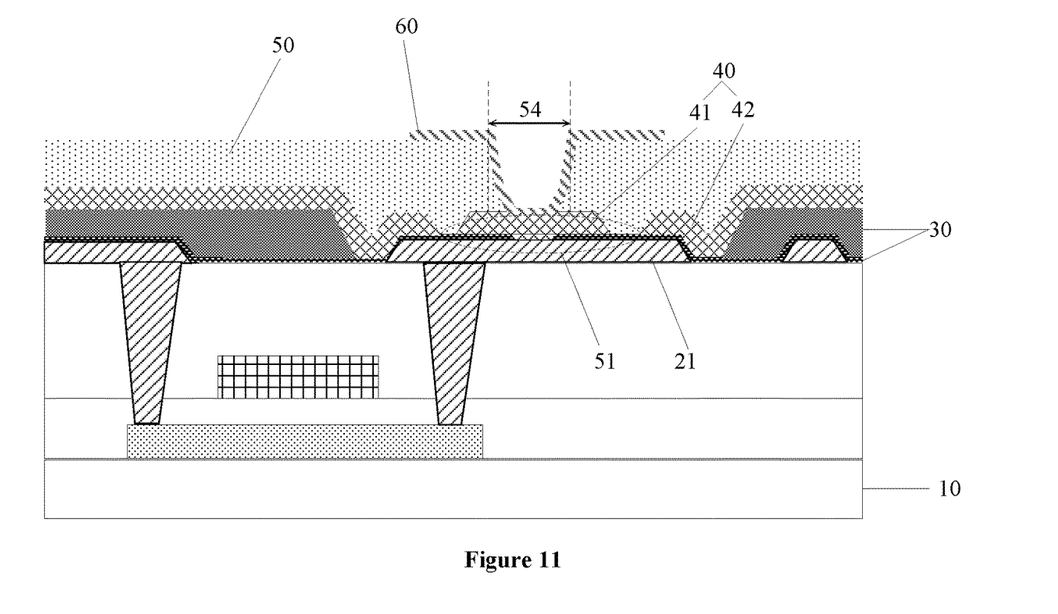
FIG. 11 illustrates a schematic diagram of another exemplary display panel consistent with disclosed embodiments of the present disclosure.

In one embodiment, referring to FIG. 7 and FIG. 11, the display panel may further include a second insulating layer 50 and a second electrode 60. The second insulating layer 50 may be disposed on the side of the second metal layer 40 away from the first substrate 10. The second insulating layer 50 may contain a fourth opening 54, and the fourth opening 54 may expose at least a portion of the first electrical connection portion 41.

The second electrode 60 may be disposed on a side of the second insulating layer 50 away from the first substrate 40, and may be electrically connected to the first electrical connection portion 41 through the fourth opening 54. Optionally, the second insulating layer may be made of an organic material, and may have a thickness in a range of approximately 1 μm-3 μm.

In one embodiment, referring to FIG. 11, the second electrode 60 may cover the first region 51. Through the cooperation of the second electrode 60 and the light-shielding portion 42, the light incident from the side of the second electrode 60 away from the first substrate 40 may be blocked, to reduce the risk of light leakage.

Figure 12:
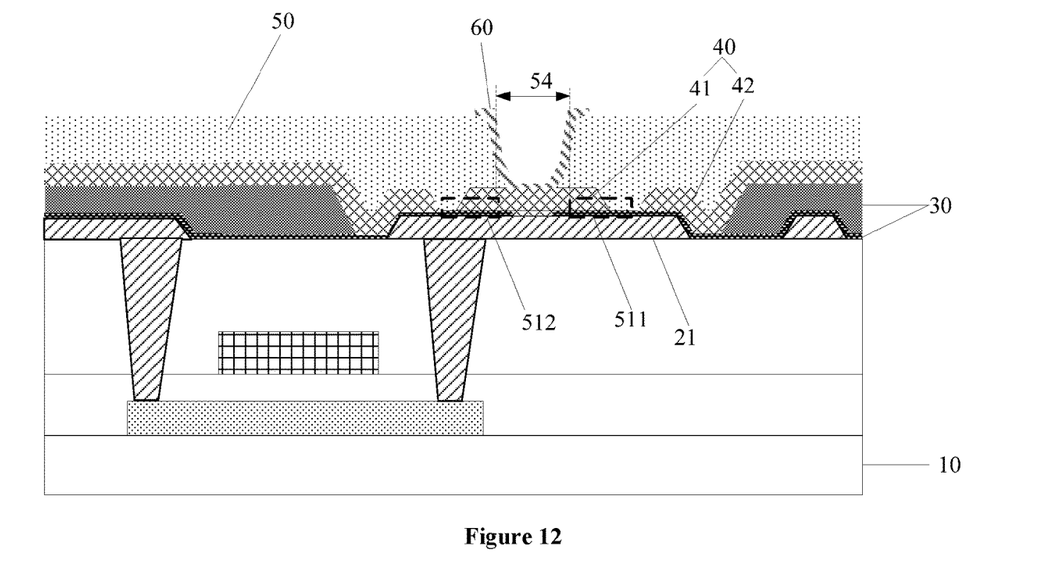
FIG. 12 illustrates a schematic diagram of another exemplary display panel consistent with disclosed embodiments of the present disclosure.

In another embodiment, referring to FIG. 12, a projection of the second electrode 60 on the first substrate 10 may be located within the projection of the second opening on the first substrate 10, and an area of the projection of the second electrode 60 on the first substrate 10 may be smaller than the area of the projection of the second opening on the first substrate 10. In other words, the projection of the second electrode 60 on the first substrate 10 may be within the projection of the first region 51 on the first substrate 10, and an area of the projection of the second electrode 60 on the first substrate 10 may be smaller than an area of the projection of the first region 51 on the first substrate 10.

Under the premise of without affecting the light-emitting area of the display panel, the area of the second electrode in the fourth opening 54 may be reduced, the area of the second electrode corresponding to the light-emitting region may increase, the service life of the display panel may increase, and the reflection effect of the second electrode on the light inside the display panel may be reduced.

Figure 13:
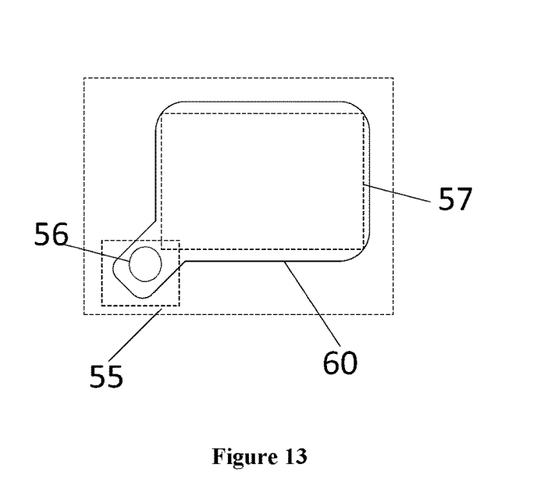
FIG. 13 illustrates a top view of a pixel region in an exemplary display panel consistent with disclosed embodiments of the present disclosure.

FIG. 13 illustrates a top view of a pixel region. Referring to FIG. 13, the position where the first electrode 21 is electrically connected to the second electrode 60 may correspond to a region 55 in FIG. 13, the fourth opening 54 may correspond to a region 56 in FIG. 13, and the light-emitting region may correspond to a region 57 in FIG. 13. Referring to FIG. 13, under the premise that the area of the pixel region is fixed, the area of the region where the fourth opening is located may be reduced, and the area of the pixel region for disposing the light-emitting region may increase.

Referring to FIG. 12, the first region may include a first portion 511 disposed on a side of the fourth opening 54 facing toward the light-transmitting region (a region where an imaging hole may be disposed in the light-shielding portion 42), and a second portion 512 disposed on a side of the fourth opening 54 away from the light-transmitting region. In another embodiment, the second electrode 60 may merely cover the region corresponding to the fourth opening 54, and may not cover the first portion 511 and the second portion 512 disposed on both sides of the fourth opening 54. Under the premise of without affecting the light-emitting area of the display panel, the area of the second electrode may be reduced.

It should be noted that in one embodiment, when the second electrode merely covers the second portion of the first region and does not cover the first portion of the first region, a substantially large amount of light in the external environment may enter the first portion of the first region. Because the thickness of the first insulating layer disposed in the first slit region is small, the amount of the light entering the first portion and transmitted to the light-transmitting region through the portion of the first insulating layer disposed in the first slit region may be substantially small, which may have little effect on the fingerprint recognition accuracy of the fingerprint recognition module.

Figure 14:
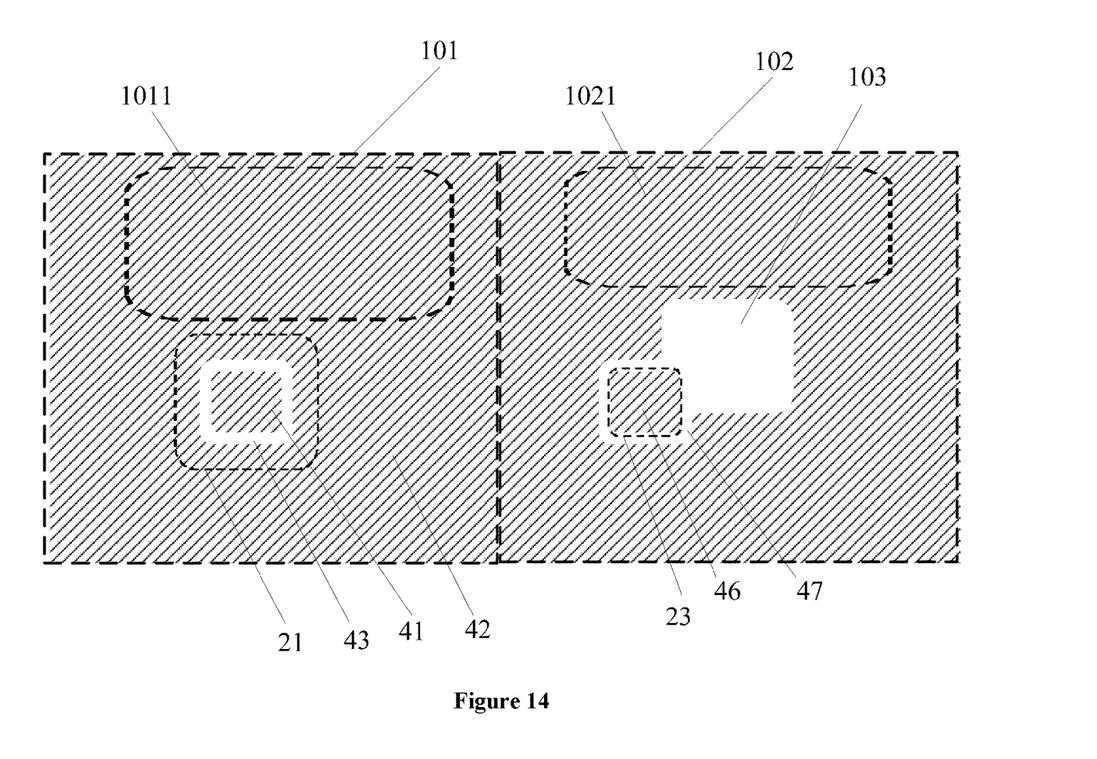
FIG. 14 illustrates a local top view of a second metal layer in another exemplary display panel consistent with disclosed embodiments of the present disclosure.

In one embodiment, referring to FIG. 14, the display panel may further include a first pixel region 101 and a second pixel region 102. The first pixel region 101 may include a light-emitting region 1011, and may not include a light-transmitting region. The second pixel region 102 may include a light-emitting region 1021 and a light-transmitting region 103. In one embodiment, the first electrode 21 (shown by the dashed frame in the Figure) may be disposed in the first pixel region 101. The light-shielding portion 42 may contain an imaging hole 103 in the second pixel region 102, and a region corresponding to the imaging hole 103 may be the light-transmitting region of the second pixel region 102.

In one embodiment, an area of the light-emitting region 1011 of the first pixel region 101 may be the same as an area of the light-emitting region 1021 of the second pixel region 102. In another embodiment, the area of the light-emitting region 1011 of the first pixel region 101 may be greater than the area of the light-emitting region 1021 of the second pixel region 102. In certain embodiments, the area of the light-emitting region 1011 of the first pixel region 101 may be smaller than the area of the light-emitting region 1021 of the second pixel region 102.

Figure 15:
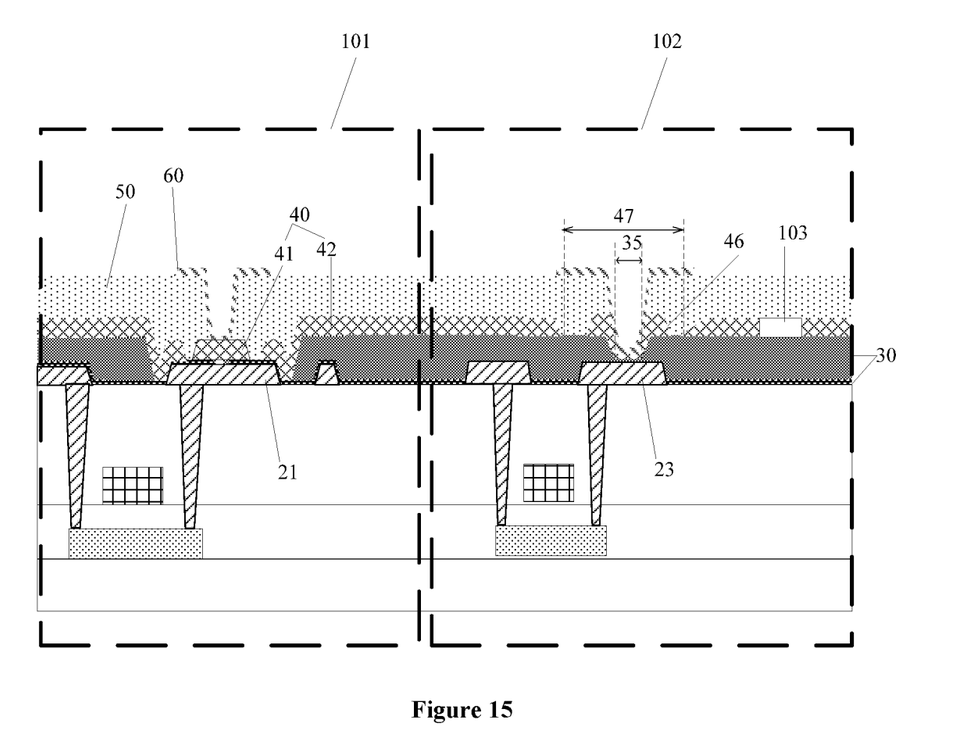
FIG. 15 illustrates a schematic diagram of another exemplary display panel consistent with disclosed embodiments of the present disclosure.

Referring to FIG. 14 and FIG. 15, in the second pixel region, the first metal layer may further include a third electrode 23 (as shown by the dashed frame in FIG. 14), and the first insulating layer 30 may further contain a fifth opening 35. The fifth opening 35 may expose at least a portion of the third electrode 23. The second metal layer 40 may further include a second electrical connection portion 46, and the light-shielding portion 42 may further contain a sixth opening 47. The second electrical connection portion 46 may be disposed in the sixth opening 47, and the second electrical connection portion 46 may be electrically connected to the third electrode 23 through the fifth opening 35.

It should be noted that in the disclosed embodiments, the first opening, the second opening, the first electrical connection portion, and any other structure involved in the foregoing embodiments may be located in the first pixel region.

In one embodiment, referring to FIG. 13 and FIG. 14, an area of the first electrode 21 may be greater than an area of the third electrode 23. Therefore, in a case where the second pixel region and the first pixel region have a same area, by reducing the area of the third electrode 23, the second pixel region may have more space for disposing the imaging hole. Therefore, the area of the light-transmitting region of the second pixel region may increase, the area of the fingerprint recognition module corresponding to the light-transmitting region may increase, the maximum amount of signal that is capable of being received by the fingerprint recognition module may increase, and the fingerprint recognition accuracy of the fingerprint recognition module may be improved.

It should be noted that in practical applications, the display panel may include a plurality of first pixel regions and a plurality of second pixel regions, and a quantity of the first pixel regions may be much greater than a quantity of the second pixel regions. In one embodiment, the second pixel region may adopt the above-mentioned third electrode and any other structure, which may have little effect on the total light leakage transmitted in the first insulating layer.

For illustrative purposes, the first pixel region and the second pixel region may be adjacent to each other as an example. In certain embodiments, any other pixel region may be disposed between the first pixel region and the second pixel region.

Figure 16:
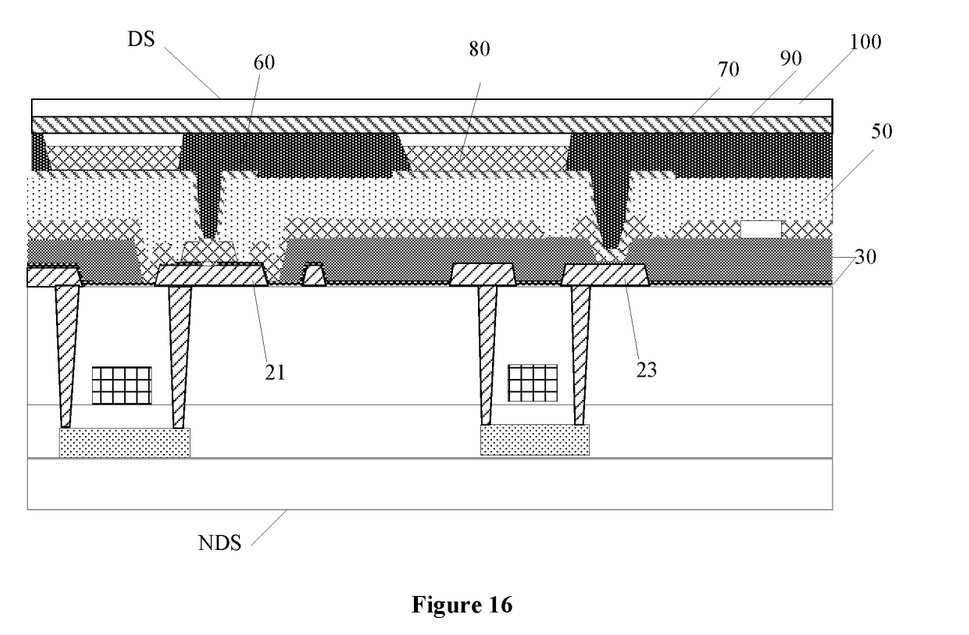
FIG. 16 illustrates a schematic diagram of another exemplary display panel consistent with disclosed embodiments of the present disclosure.

In one embodiment, referring to FIG. 16, the display panel may further include a pixel definition layer 70, a light-emitting layer, a cathode 90, and an encapsulation film layer 100. The pixel definition layer 70 may be disposed on a side of the second insulating layer 50 away from the first substrate 10. The pixel definition layer 70 may include a plurality of pixel openings. The light-emitting layer may include a plurality of light-emitting units 80, and the light-emitting unit 80 may be disposed in the pixel opening. The cathode 90 may be disposed on a side of the light-emitting layer away from the first substrate 10. The encapsulation film layer 100 may be disposed on a side of the cathode 90 away from the first substrate 10, and may encapsulate the structure on the side of the encapsulation film layer 100 facing toward the first substrate 10.

The side of the encapsulation film layer 100 away from the first substrate 10 may be a display side DS of the display panel, and the side of the first substrate 10 away from the encapsulation film layer 100 may be the non-display side NDS of the display panel.

Figure 17:
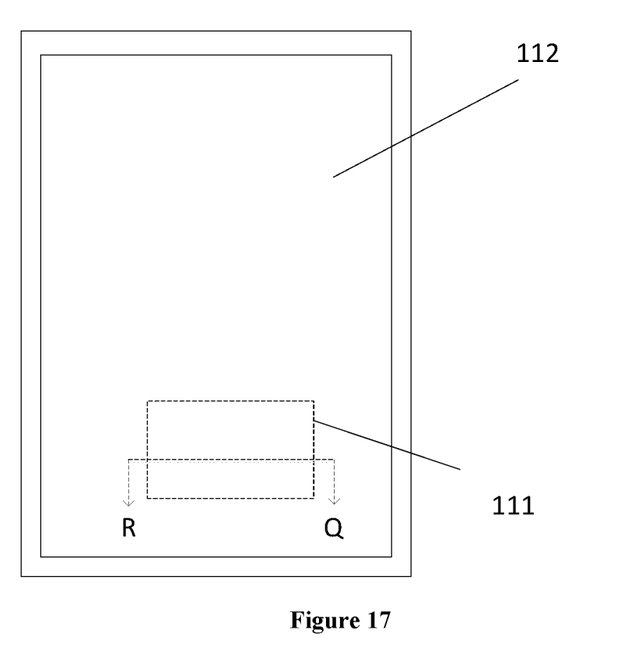
FIG. 17 illustrates a top view of an exemplary display device consistent with disclosed embodiments of the present disclosure.
Figure 18:
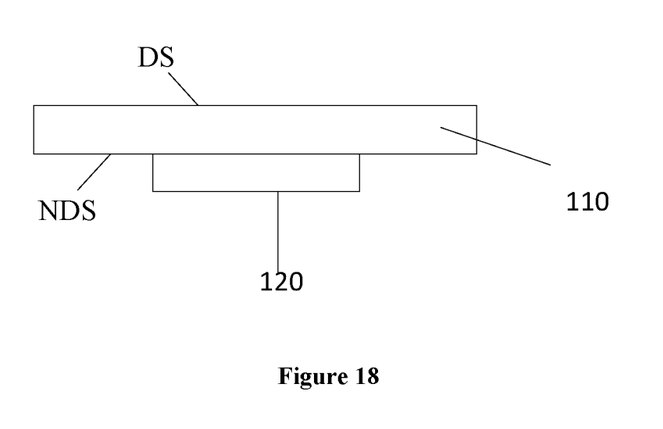
FIG. 18 illustrates a RQ sectional view of an exemplary display device in FIG. 17 consistent with disclosed embodiments of the present disclosure.

The present disclosure also provides a display device. FIG. 17 illustrates a schematic diagram of the display device, and FIG. 18 illustrates a RQ cross-sectional view of the display device in FIG. 17. Referring to FIG. 17 and FIG. 18, the display device may include a display panel 110 in any one of the disclosed embodiments, and a light collection device 120. The light collection device 120 may be disposed on the non-display side NDS of the display panel 110, and may collect the light incident from the display side DS of the display panel 110 and emitted from the non-display side NDS of the display panel 110.

In one embodiment, the display panel 110 may include a display region 112. The display region 112 may include a light-collection region 111 and a plurality of pixel regions. Optionally, in one embodiment, the plurality of pixel regions may include at least one first pixel region 101 and at least one second pixel region 102 in any one of the above disclosed embodiments.

In another embodiment, a plurality of first pixel regions 101 may be respectively located in the light collection region 111 and the display region 112 except for the light collection region 111, and a plurality of second pixel regions 102 may be located in the light collection region 111.

Specifically, in one embodiment, referring to FIG. 17, the light collection device 120 may collect the light incident from the imaging hole 103 in the second pixel region 102 of the display panel 110 and emitted from a region of the non-display side NDS of the display panel 110 corresponding to the imaging hole 103. It should be noted that in one embodiment, the region corresponding to the imaging hole in the second pixel region may be located in the light collection region of the display panel.

Optionally, in one embodiment, the light collection device may be a fingerprint recognition module, which may not be limited by the present disclosure. In certain embodiments, the light collection device may be an image acquisition module, such as a camera, which may be determined according to practical applications.

Accordingly, the display panel and display device in the disclosed embodiments may include a first metal layer, a second metal layer, and a first insulating layer disposed between the first metal layer and the second metal layer. The second metal layer may include a light-shielding portion and a first electrical connection portion that are insulated from each other. The light-shielding portion may contain a second opening, and the first electrical connection portion may be disposed in the second opening. The first electrical connection portion may be electrically connected to the first electrode of the first metal layer through the first opening.

A region defined by the second opening may be a first region, and a second region may surround the first region. A portion of the first insulating layer disposed in the first region may have a first thickness, and another portion of the first insulating layer disposed in the second region may have a second thickness. The first thickness may be smaller than the second thickness, such that the portion of the first insulating layer disposed in the first slit region between the light-shielding portion and the first electrical connection portion may be substantially small.

Therefore, when the light entering the light-emitting region of the display panel from the display side of the display panel is transmitted to the light-transmitting region of the display panel through the portion of the first insulating layer disposed in the first slit region, the amount of light that is capable of being transmitted through the first insulating layer disposed in the first slit region may be substantially small. Further, the amount of light that enters the light-emitting region, is transmitted to the light-transmitting region through the first insulating layer, and emits from the light-transmitting region may be reduced. Among the amount of light emitted from the light-transmitting region of the display panel, the proportion of light that perpendicularly enters the light-transmitting region may increase.

When the display panel is applied to a display device with a fingerprint recognition function, the amount of light that is capable of being received by the fingerprint recognition module and perpendicularly enters the light-transmitting region may increase, thereby increasing the amount of fingerprint signal light among the light received by the fingerprint recognition module, and improving the fingerprint recognition accuracy of the display device.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display panel, comprising:
   a first substrate;
   a first metal layer, disposed on a side of the first substrate and including a first electrode;
   a first insulating layer, disposed on a side of the first metal layer away from the first substrate, wherein the first insulating layer contains a first opening, and the first opening exposes at least a portion of the first electrode; and
   a second metal layer, disposed on a side of the first insulating layer away from the first substrate, wherein the second metal layer includes a light-shielding portion and a first electrical connection portion that are insulated from each other, the light-shielding portion contains a second opening, the first electrical connection portion is disposed in the second opening, the first electrical connection portion is electrically connected to the first electrode through the first opening, and a projection of the second opening on the first substrate is within a projection of the first electrode on the first substrate, wherein:
   a region defined by the second opening is a first region, and a second region surrounds the first region,
   a portion of the first insulating layer located in the first region has a first thickness, and another portion of the first insulating layer located in the second region has a second thickness, wherein the first thickness is smaller than the second thickness,
   the first insulating layer includes a first film layer and a second film layer that are stacked, and the first film layer is disposed on a side of the second film layer close to the first substrate,
   the first film layer contains the first opening, and the second film layer contains a third opening, wherein a projection of the first opening on the first substrate is located within a projection of the third opening on the first substrate, and
   the projection of the second opening on the first substrate is within the projection of the third opening on the first substrate.

2. The display panel according to claim 1, wherein:
   the first thickness is in a range of approximately 50 nm-500 nm.

3. The display panel according to claim 1, wherein:
   the first film layer is extended from the second region to the first region, and the second film layer is disposed in the second region; and the first thickness is a thickness of the first film layer, and the second thickness is a sum of the thickness of the first film layer and a thickness of the second film layer.

4. The display panel according to claim 3, wherein: the second film layer and the first electrode have an overlapped portion.

5. The display panel according to claim 3, wherein: the second film layer does not overlap the first electrode.

6. The display panel according to claim 5, wherein: the first metal layer further includes a plurality of wirings, and a wiring of the plurality of wirings and the first electrode are insulated from each other; and the second film layer covers the wiring.

7. The display panel according to claim 3, wherein: the first film layer is a passivation layer; and the second film layer is a first planarization layer.

8. The display panel according to claim 3, wherein: the first insulating layer is a second planarization layer.

9. The display panel according to claim 4, wherein: the first electrode and the light-shielding portion have an overlapped portion.

10. The display panel according to claim 9, wherein: a width of the overlapped portion is in a range of approximately 2 μm-5 μm.

11. The display panel according to claim 1, further including:
a second insulating layer, disposed on a side of the second metal layer away from the first substrate, wherein the second insulating layer contains a fourth opening, and the fourth opening exposes at least a portion of the first electrical connection portion; and
a second electrode, disposed on a side of the second insulating layer away from the first substrate, wherein the second electrode is electrically connected to the first electrical connection portion through the fourth opening.

12. The display panel according to claim 11, wherein: the second electrode covers the first region.

13. The display panel according to claim 11, wherein:
a projection of the second electrode on the first substrate is located within the projection of the second opening on the first substrate; and
an area of the projection of the second electrode on the first substrate is smaller than an area of the projection of the second opening on the first substrate.

14. The display panel according to claim 4, further including:
a first pixel region, wherein the first electrode is located in the first pixel region; and
a second pixel region, wherein the light-shielding portion contains an imaging hole in the second pixel region.

15. The display panel according to claim 14, wherein:
in the second pixel region, the first metal layer further includes a third electrode,
the first insulating layer further contains a fifth opening, and the fifth opening exposes at least a portion of the third electrode,
the second metal layer further includes a second electrical connection portion, the light-shielding portion further contains a sixth opening, and the second electrical connection portion is disposed in the sixth opening, and
the second electrical connection portion is electrically connected to the third electrode through the fifth opening; and
an area of the first electrode is greater than an area of the third electrode.

16. The display panel according to claim 15, wherein:
a portion of the first insulating layer disposed in the second pixel region has a third thickness, and the third thickness is greater than the first thickness.

17. The display panel according to claim 1, further including:
a thin film transistor, wherein the thin film transistor includes a gate, a source, a drain, and an active layer, and the first electrode is one of the source and the drain of the thin film transistor.

18. The display panel according to claim 1, wherein:
the first metal layer includes a plurality of power lines, and a power line of the plurality of power lines is electrically connected to the light-shielding portion through a through-hole of the first insulating layer.

19. A display device, comprising:
a display panel, the display panel including:
a first substrate,
a first metal layer, disposed on a side of the first substrate and including a first electrode,
a first insulating layer, disposed on a side of the first metal layer away from the first substrate, wherein the first insulating layer contains a first opening, and the first opening exposes at least a portion of the first electrode, and
a second metal layer, disposed on a side of the first insulating layer away from the first substrate, wherein the second metal layer includes a light-shielding portion and a first electrical connection portion that are insulated from each other, the light-shielding portion contains a second opening, the first electrical connection portion is disposed in the second opening, the first electrical connection portion is electrically connected to the first electrode through the first opening, and the projection of the second opening on the first substrate is within a projection of the first electrode on the first substrate, wherein:
a region defined by the second opening is a first region, and a second region surrounds the first region,
a portion of the first insulating layer located in the first region has a first thickness, and another portion of the first insulating layer located in the second region has a second thickness, wherein the first thickness is smaller than the second thickness,
the first insulating layer includes a first film layer and a second film layer that are stacked, and the first film layer is disposed on a side of the second film layer close to the first substrate,
the first film layer contains the first opening, and the second film layer contains a third opening, wherein a projection of the first opening on the first substrate is located within a projection of the third opening on the first substrate, and
the projection of the second opening on the first substrate is within the projection of the third opening on the first substrate; and
a light collection device, disposed on a non-display side of the display panel, wherein the light collection device collects light incident from a display side of the display panel and emitted from the non-display side of the display panel.

* * * * *